US011983298B2

(12) United States Patent
Villax et al.

(10) Patent No.: US 11,983,298 B2
(45) Date of Patent: May 14, 2024

(54) COMPUTER SYSTEM AND METHOD OF OPERATING SAME FOR HANDLING ANONYMOUS DATA

(71) Applicant: MEDICEUS DADOS DE SAÚDE, S.A., Lisboa-Carnide (PT)

(72) Inventors: Peter Villax, Lisboa-Carnide (PT); Ricardo Loura, Lisboa-Carnide (PT)

(73) Assignee: MEDICEUS DADOR DE SAÚDE, S.A., Carnide (PT)

( * ) Notice: Subject to any disclaimer, the term of this patent is extended or adjusted under 35 U.S.C. 154(b) by 309 days.

(21) Appl. No.: 17/607,202

(22) PCT Filed: Apr. 29, 2020

(86) PCT No.: PCT/EP2020/061821
§ 371 (c)(1),
(2) Date: Oct. 28, 2021

(87) PCT Pub. No.: WO2020/221778
PCT Pub. Date: Nov. 5, 2020

(65) Prior Publication Data
US 2022/0222373 A1    Jul. 14, 2022

(30) Foreign Application Priority Data
Apr. 29, 2019   (PT) .......................................... 115479

(51) Int. Cl.
G06F 21/62     (2013.01)
G06F 21/60     (2013.01)

(52) U.S. Cl.
CPC ........ *G06F 21/6254* (2013.01); *G06F 21/602* (2013.01); *G06F 2221/2115* (2013.01); *G06F 2221/2141* (2013.01)

(58) Field of Classification Search
None
See application file for complete search history.

(56) References Cited

U.S. PATENT DOCUMENTS

| | | |
|---|---|---|
| 5,369,702 A | 11/1994 | Shanton |
| 7,840,813 B2 | 11/2010 | Canard et al. |
| 8,234,698 B2 | 7/2012 | Lee et al. |
| 8,635,464 B2 | 1/2014 | Yacobi |
| 9,910,902 B1 | 3/2018 | Kramer et al. |
| 2002/0091650 A1 | 7/2002 | Ellis |

(Continued)

FOREIGN PATENT DOCUMENTS

WO       2018/201009 A1    11/2018

*Primary Examiner* — William J. Goodchild
(74) *Attorney, Agent, or Firm* — 24IP Law Group USA, PLLC; Timothy R DeWitt

(57) ABSTRACT

A system and method are presented to enable computers to communicate and to exchange personal data in a secure system where security is achieved by a computer de-identifying the personal data through the removal of all personal identifiers and subsequently re-identifying the data with an anonymous identifier generated by the computer operated by the data subject. Even though the personal data and the data subject are anonymized, the computers in the present system are able to establish a communications session between the anonymous data subject's computer and the computer system holding information of interest to the data subject and to send that information to its owner.

10 Claims, 6 Drawing Sheets

(56) References Cited

U.S. PATENT DOCUMENTS

| | | | |
|---|---|---|---|
| 2007/0192139 A1* | 8/2007 | Cookson | G16H 10/60 705/3 |
| 2010/0131765 A1 | 5/2010 | Bromley | |
| 2014/0372149 A1 | 12/2014 | Friese et al. | |
| 2015/0149208 A1 | 5/2015 | Lynch | |
| 2016/0147945 A1* | 5/2016 | MacCarthy | H04W 12/02 705/51 |
| 2017/0372096 A1 | 12/2017 | Yousfi | |

* cited by examiner

COMPUTER SYSTEM AND METHOD OF OPERATING SAME FOR HANDLING ANONYMOUS DATA

CROSS REFERENCE TO RELATED APPLICATIONS

This application claims benefit and priority to Portuguese patent application No. 115.479, filed on 29 Apr. 2019 and is a national phase entry of International Patent Application No. PCT/EP2020061921, filed on 29 Apr. 2020.

TECHNICAL FIELD

The present application is in the field of computer systems and cryptography and relates to improvements in the protection of user identity and privacy rights through the use of intrinsically safe systems architectures.

BACKGROUND OF THE INVENTION

This section is intended to provide a background or context to the invention that is recited in the claims and may include concepts that could be pursued and are novel. Unless clear from the context or explicitly stated as prior art, such disclosures are not to be admitted as prior art to the description and claims in the present application.

The internet has enabled the creation of computer systems which handle the personal data of billions of people. They have brought the information age from the realm of corporate and state entities to the level of the individual. They have allowed people to have unparalleled access to information that is useful to their work, social interactions and commerce, and to actions which allow them to work, interact and trade with ease, speed, convenience and very low costs. Internet-based companies are able to provide services to their customers often at no cost to them, because the data such companies collect from customers in computer-based, internet-connected interactions have economic value. Consumer preferences and choices collected during these interactions and trades allow internet-based companies to build consumer profiles which allow them to precisely target commercial offers to consumers included in the defined profiles, thereby lowering targeting, marketing and selling costs, and even to direct the commercial offer to the individual consumer. This has resulted in more consumer choice, lower prices and more sales volume and is therefore highly beneficial to the economy and to society. This is achieved by the citizen with actions that are costless—merely granting access to companies to their personal data.

This ease to identify the consumer's preferences has created a second source of value for companies, which goes beyond the revenues earned from the sale of conventional products and services, and includes the revenues from the sale of the consumers' personal data to third parties that use the data for directed advertising on the internet and increase their sales of conventional products and services.

Combining this ability to target mass markets with high precision has been further sophisticated with the processing of personal consumer data combined with physical world data. Recently, this ability to combine data from multiple sources has been further enhanced with technologies which allow the data processor to determine patterns of behaviour and choice and from there to predict and sometimes to influence citizen actions which are deemed by social and moral convention to be sovereign acts, to be free from third party interference. At times, the personal data that was given by the citizen, in good faith, to internet-based companies in exchange for improved services and economic benefit is used for covert purposes that bear no relation to the original purpose and intent for which the personal data was given.

Yet in other areas, the very fear of personal data misuse has led to the sub-optimal development of computer systems and a failure in bringing benefits to the citizen. This is particularly visible in certain kinds of sensitive personal data, such as medical records and health data, which is characterized by being stored in multiple, unconnected, non-interoperable systems where data atomization has been the involuntary mechanism for personal data protection. Data is redundantly spread over so many files, databases and computer systems belonging to multiple health care providers that is indeed very difficult if not impossible to access the comprehensive clinical history of a patient. To collect personal health care data and consolidate it in a single system would have a significant public interest.

There is therefore an important need to improve the way computer systems treat personal data, preventing situations where it is abused, or addressing others where it is underused. Such is the invention that is presented here, and it addresses a problem that is rooted in a technological deficiency characteristic of the internet, which is the inability, until now, to use personal data in a secure and consented way, where the citizen is in control and its privacy rights are protected. Solving this control issue ideally would not alter the internet communications protocol, which would not be practical and is indeed not necessary, but by establishing a new relationship model between its various participants and placing the individual as the controlling party in internet interactions, via its personal computing device.

The solution indicated by the present invention is based on the need for data record anonymization and encryption. The protection of personal data on the internet, particularly sensitive data such as personal health data or any other kind of data the owner wishes to be kept reserved, confidential or secret is important and several methods achieving this purpose have been developed. One such method involves anonymization which hides the owner's identity and irreversible anonymization, which makes re-identification impossible. In applications where it is useful to maintain a data subject anonymous but maintain the ability to aggregate data under an identifying term, an anonymous identifier that has a one-to-one relation to the owner can be used. This way data belonging to the same person may be stored, organized and processed under the owner's anonymous identifier key.

Care must also be taken to avoid computer systems and computers applications that have access to re-identification means and a technical way of doing so is by using in these computers anonymous identifiers which bear no relationship to the original name or personal identifiers, such as the owner's date of birth, address or personal identification numbers, for instance. Moreover, particularly in the case of computers connected to very large networks such as the internet and with the possibility of public access, to store and to communicate the data in plaintext, i.e., immediately readable and understandable by any party, is a risk to privacy. The use of cryptographic methods is a useful solution to the problem and may be used to protect sensitive information of interest such as purchase records, medical records, financial records, tax records, property records, consumer preferences, etc., which are processed in these networked computer systems.

Using these techniques, it is necessary that even if the data subject's personal identifiers are encrypted and the information of interest is anonymized, the information of interest does not contain data which could allow the data subject's identity to be inferred, by matching that plaintext data with other databases where similar data of interest is included and the subject's identity is known. Therefore, it appears that an effective way to secure the privacy rights of the data subject is simply to hide its identity. In order to hide it thoroughly, it might even be useful to eliminate the conventional username/password identity verification method, which in order to function may require a computer to know the username of the data subject and to store its password.

However, there are several applications where there is a need to revert the anonymization of the owner's personal data. Such applications include health care, where there is a need to re-identify the owner, for instance when it is desirable to change the medical treatment and thus to positively identify the patient. Besides health care, there are other situations where the owner's anonymization needs to be reverted, and this includes all situations where the owner needs or wishes to be contacted by the data or service provider—to prove ownership of assets, to receive information about bills to pay, changes to terms and conditions, product information, the offer of new services, the request for consent, etc.

Reversible anonymization is known as pseudonymization, which is defined in the European Union General Data Protection Regulation as the processing of personal data in such a manner that the personal data can no longer be attributed to a specific data subject without the use of additional information. One practical implementation of this is to configure a computer system to select a data record containing information of interest relating to its data subject owner, identified with a confidential code where the code is also stored in a different file location of the same computer, or other computer, which contains also the data subject's name and personal identifiers. By matching the information in both files, the data subject may be re-identified. This way the computer file containing the pseudonymized health records or other sensitive information from several data subjects can be processed without their identity being displayed, but when the need arises, each data record can be traced back to the data subject's identity by means of the second data file.

Unfortunately, this division of data where the data subject's real identity is kept separate in another computer file is prone to abuse, particularly when both files are under the control of the same data controller computer server, the computer server operated by an entity which, among other activities, uses its computer systems to process data belonging to a data subject and originating from the data subject's computer. Unless intentional abuse or accidental re-identification are absolutely prevented by appropriately configuring all computers involved, there is always a risk that a data breach may occur and personal data be compromised and used for purposes that the data subject did not originally consent to, either explicitly or implicitly. For this reason, there is a need for data controller computer servers to be configured to prevent internal operators, either by accident or intent, or malicious external operators from reverting a pseudonymized identifier, but such configuration should not prevent the data controller computer server from being capable of establishing communication with the data subject computer to transmit and exchange the subject's data.

The present application presents a solution to this paradox and describes a secure computer system and method where the data subject's computer is configured to generate an anonymous identifier used to hide the data subject's name identity and personal identifiers, thus preventing such identifying data from being transmitted to the data controller computer server and therefore rendering them insensitive to accidental release or malicious breach. The data subject's computer is further configured to allow the data subject to indicate its consent as to whether its personal data can be transferred, to whom, for which uses and for how long, and to establish communication with the data controller computer server, in such a way that the data controller computer server can verify the identity of the data subject's computer.

There are several references in the literature to variable anonymization models which allow a measure of personal data to be known or discoverable.

Patent Application WO/2018/201009 describes systems and methods achieving a purpose similar to that of the present application but does so through the use of a dynamic identifier for each user. Dynamic identifiers are very efficient in terms of anonymizing users but raise the issue of legal liability as to which entity is responsible for attributing the identifier to a user, managing the dynamic change of the identifier and guaranteeing that the dynamically changed identifier always refers to the same person. Static, severely guarded identifiers and data minimization methods may offer a better compromise between security, operability and legal guarantees.

United States patent application publication 2015/0149208 describes a system to collect and anonymize health data from multiple health care providers where the focus is on improving the confidence that the anonymous identifier always refers to the same person.

United States patent application publication 2002/0091650 describes a system which gives marketers confidential information about consumer choices by providing a clear understanding of the customers as a group, or as specific subgroups in terms of geography, lifestyles, buying habits, while protecting their privacy and identity. However, the solution presented falls short of being able of reaching specific individuals.

U.S. Pat. No. 8,234,698 describes a system where a data subject is able to access web services in a manner that still allows the web services provider to positively identify the customer, say, to secure payment for a subscription or a transaction, while preventing access to the customer's personal identifiers. This is done via a third-party anonymous certification authority as well as face-to-face authentication by a reliable organization such as a bank or a securities company. This is a complex and costly procedure.

U.S. Pat. No. 7,840,813 and United States patent application publication 2010/0131765 both include some of the features of the previous case, but specifically allow for anonymity revocation or reversal, contrary to the objective of the present application where anonymity is desirably irreversible and where reversibility, when possible, is outside the control of the data controller.

United States patent application publication 2014/0372149 attempts to reconcile the need for anonymization of patient personal data while providing access to the patient's health data without ambiguity, by means of storing patient records which are stored in the cloud, with identification fields anonymized for safe access of the patient records by multiple doctors. These patient records, mainly images, are accessed on the main display screen via an authorizing computer operated by the patient's assigned doctor. This computer contains predefined data about the patients whose data are to be inspected by the doctor and only patient records matching the predefined data are displayed. However, the data controller and processors computer servers contain both the patient records and the patient's identification data and can therefore be programmed to match the former to the latter and therefore re-identify the patient.

U.S. Pat. No. 8,635,464 details a comprehensive method for encrypting a computer system, but one where a certification and revocation authority and the data subject are separate entities. Here, the data subject is not in control of the management of its encryption codes and is not in a position to be in sole control to the access to its personal data.

U.S. Pat. No. 5,369,702 describes a multi-level multimedia encryption system where the encrypted object is labelled with a code which determines whether the receiver of the encrypted message is authorized to decrypt it. This system employs nested encryption so that the same message may be transmitted from sender to receiver to receiver in a transmission chain, but access will be selective depending on whether the receiver is an authorized reader as specified by the label. The invention is directed to the distribution of information to a large number of people, where there is a need to selectively give access based on the clearance levels of receivers.

U.S. Pat. No. 9,910,902 describes a process to anonymize user identifiable information, but which does not completely hide from the data processor computer the data subject's identity, as the processor retains anonymization mapping tables enabling it to re-identify the data subject.

United States patent application US 2016/147945 A1 describes a method and system for searching and obtaining patient healthcare data related to a data subject from one or more data provider computer servers. Personal identifiers of the patient are not disclosed while transfer of the data of interest from data provider computer servers to a trusted data controller computer server. The data of interest is linked to personal identifiers of the corresponding data subject in the trusted data controller computer server and therefore is not handled and stored in an anonymized form in the trusted data controller computer server.

United States patent application US 2007/192139 A1 describes systems and methods searching, obtaining and re-identifying patient healthcare data related to a data subject. An encrypted anonymized identifier is used to obtain a patient identifier associated with data of interest concerning a data subject. Data of interest concerning a data subject is transferred from data provider computer servers to a trusted data controller computer server in an anonymized form. The data subject is not in control of the transmission of the corresponding data of interest to the trusted data controller computer server. The data of interest is not returned to the data subject from the trusted data controller computer server.

United States patent application US 2017/372096 A1 describes systems and methods to transfer data of interest concerning a data subject from a first server in a first region to a second server in a second region in an anonymized form. The data of interest is stored in the first server together with personal identifiers identifying the data subjects. The personal identifiers are removed from the data of interest and the data of interest is transmitted together with an anonymous identifier to the second server to conduct data analysis on the second server. The analysed data is transmitted back from the second server to the first server, re-identified with personal identifiers based on the anonymous identifier on the first server and stored on the first server. The data subject is not in control of the transmission of the corresponding data of interest to the trusted data controller computer server.

There are therefore several prior art cases where verification, encryption and access rights management systems have been used to protect personal data. However, none of them have placed the citizen data subject at the centre of the protection model, with the full and sole power to grant and revoke access to its personal data, with anonymization and with the possibility to maintain encrypted communication with the party managing and processing the data subject's anonymized personal data.

We have now developed a unique computer system and a method for using it to enable secure data processing and communication, simultaneously providing for such access and prevention of access, in a manner that is controlled automatically by the data subject via its computer, using tools at its disposal and without the need for special knowledge.

The invention is useful in any field where personal data is stored in a computer system and there is a need to protect the privacy of the data subject or data owner. A list of possible sensitive fields includes scientific or non-scientific studies, data collections and data extractions where the information of interest may include gender, sexual orientation, race, medical and care data, genetic data, criminal records, biometric data, behaviour, lifestyle, ability, religion, beliefs, political options, party affiliation, trade union affiliation, policy-making, opinion polls and surveys, responses to advertising, focus groups, human resources recruitment, business management, consumer tastes and purchasing decisions, purchase records and history, tax records and history, investments and decisions to invest or save, likes and dislikes, social relationships, etc. Indeed, areas so sensitive that some jurisdictions prohibit their processing by default, allowing them only under justified exceptions. The present invention allows such sensitive fields to be researched with the strictest respect of the privacy rights of individuals and protection is claimed for all applicable fields.

SUMMARY OF THE INVENTION

Invention entities. In presenting the invention, reference will now be made to the various participants and functions present in this secure personal data exchange and processing computer system.

The present invention identifies three categories of participants and their respective computer systems. In the first category, data subjects or subjects are the individual persons or entities who use computers to process data, including personal data. They are citizens, consumers, professionals, recruiters, managers, taxpayers, patients, companies, organizations, non-profit organizations, non-government organizations, states, intelligence experts, the military, whistleblowers, believers, voters, travellers, writers, photographers, artists, friends, investors, savers, etc., in fact persons or entities in any function where data is generated as a result of human activity. Data produced by machines such as monitoring sensors is also included in this scope and the data subject will be the person or entity who has originated the data. Actual legal ownership may vary according to jurisdiction, but for the purpose of the present application, "data subject" refers to the person or entity who originally generated the computer data or on whose behalf it was generated. A valuable characteristic of this data is that when it is generated in very large scales, it is possible to extract new information and analyse correlations, causes and effects and patterns of performance, behaviour or choices. The use of computers is needed for all such operations, but generally, they are not prepared to give data subjects adequate protection for their privacy rights.

In the second category, data controllers are persons or entities who use computer systems and are legally responsible for the operations of data processing, even if they sub-contract it to specialist data processors. Some data controllers derive economic benefit from access to the information of data subjects, as a principal or strategic business objective. Such data controllers presently include a) internet search engine platforms, which record data subjects' interests; b) internet business and trade platforms, which store data and may create marketplaces for consumers and providers of goods and services; and c) internet social networks, which record and help manage social interaction and communication between people. All three such groups record the data subjects' information on data searches, purchases and social interactions to obtain a precise consumer profile of each individual and may use that information and profile data to sell advertising services and precise consumer targeting information and means. In this case, data subjects benefit by being offered free services of high value and convenience while data controllers turn the subjects' free data into a profitable business.

The present application creates a new type of data controller computer server, which accesses, retrieves and consolidates subject data from any source where it may be located and uses it in a way which is consistent with the protection of the citizen's privacy rights and self-determination. This data controller will be selected by the data subject to carry out, on the subject's behalf, all such data extraction, consolidation, storage and processing while securing privacy rights. In the present invention, this entity is called the trusted data controller and it operates the trusted data controller computer server. The trusted data controller computer server is configured, as part of the computer system described in the present invention, to process personal data in a way that protects the privacy rights of data subjects.

The third category of participant is the data provider. There are many corporate entities where the principal business is to provide services or to sell goods, but which in the process of conducting their main activity acquire or generate very large amounts of valuable personal data through the use of computer systems. Examples include the above-mentioned data providers, banks, insurance companies, accountants, tax advisors, financial companies, marketing companies, consumer survey companies, pharmaceutical companies, contract research organizations, non-government organizations, national health services, census organizations, public opinion poll companies, hospitals, doctors' offices, clinical testing services companies, etc. Indeed, increasingly the line is blurred between those companies where data is the main business, and service and product companies where the importance of data is growing, sometimes over and above the importance of the original business. What characterizes this latter group is that their computer systems hold large data sets of personal information and they may have an interest to exploit them economically by contracting with a specialist data controller. Configuring data provider computer servers to operate in a way that ensures the protection of privacy rights of data subjects is a part of this invention.

Certain types of data provider are particularly important in the present invention. The health care provider is one such type of provider and includes doctors, pharmacists, nurses and any personnel who are authorized to consult the subject's clinical records for the purpose of treatment and at the same time add new treatment and health information. Here, there is a need for the health care provider computer server to be able to positively identify the data subject as patient, to make sure that the underlying medical records do indeed belong to the patient being observed and treated, but this access must not compromise the privacy of the data subject's information.

An optional fourth category of participant is the identity verification provider, where a computer server verifies the identity of the data subject so that the person's identity may be confirmed. In one online embodiment, the identity verification provider is a computer server configured to access and connect to computer servers managing very large databases storing citizen information and specifically identification data, such as the name, personal identifiers and, importantly for the present application, an electronic address, an email address or a number associated with the data subject's smartphone or tablet or any other personal computing devices with communications capabilities. Examples are government databases of driving license agencies or tax authorities and private databases of cell-phone operators.

Personal identifiers are information elements which can be used to identify the data subject and include the person's name, sex, date of birth, address, any personal identification numbers (identity card, tax number, social security number, national health number, insurance policy holder number, bank account number, telephone number, cell phone number, etc.), or personal addresses (residence address, employer's address, username, social network name, e-mail address, website address, computer name and electronic address, etc.), all collectively known as personal identifiers. Insofar as family members can also assist to identify a person, the personal identifiers of family members are also included in the perimeter of a person's personal identifiers.

Embodiments of the present invention use encryption technology. Encryption is the data manipulation mechanism used by a data subject computer or data controller computer server to encrypt a message so that, during transmission, a third-party computer cannot understand it, followed by the use of a closely related mechanism by the receiver to revert the manipulation process of the message, decrypt it and gain read access to its contents. Encryption methods also include the ability to confirm the identities of data subject and receiver and the ability to identify any change to the encrypted data and guarantee the integrity of its content.

Encryption requires computer cryptographic keys. A key is a sequence of letters, numbers, or bytes of information which are manipulated by a coding algorithm on the computer sender's side to transform readable text or data into series of unintelligible signs or characters. The key is then used by the receiving computer of the coded text to decrypt the message back to plain text.

Four types of computer cryptographic systems are important in the present invention.

In the first type, the sending computer and the receiving computer use the same cryptographic key and the same coding algorithm. This is known as symmetric key cryptography and is a relatively fast encoding system in terms of computer resources. A difficulty here is managing the access to this unique key and this makes it more appropriate to encode communications between just two computers—one symmetric key for each pair of sending and receiving computers.

Computer symmetric-key encryption uses a single key k for both computer encryption and decryption. There are many different types of computer symmetric key encryption. One example is the Advanced Encryption Standard ("AES"). In general, computer symmetric-key encryption employs a series of deterministic operations for encryption that can be inverted for decryption. For computer symmetric-key encryption, the encryption key is generally held in secret by both communicating computers since access to the key allows decryption to take place.

In the second type of computer cryptographic system, known as asymmetric key cryptography, the sending computer and the receiving computer use a pair of different cryptographic keys, a public key and a private key. Computer public-key/private-key cryptography is widely used in commercial transactions and information-exchange protocols. One widespread public-key/private-key cryptographic system is referred to as the "RSA" cryptographic technique, where RSA includes the first letters of the last names of the inventors of the method: Rivest, Shamir, and Adleman. In this computer cryptographic system, pairs of cryptographic keys are generated. In general, the public cryptographic key is publicly distributed, and is referred to as the "public key," while the private cryptographic key is held in secret by the computer receiving the encrypted message and is referred to as the "private key" or "secret key." In normal usage, the sending computer of the message will encode it using the public key of the receiving computer, which is generally known, and it will be decoded by the receiving computer using its private key, which is confidential.

Asymmetric key cryptographic methods can also be used to digitally sign a message to provide for message authentication between computers. In an example, the message to be signed consists of the sender's public key. The sending computer will encrypt the message using the sender's private key and send the encrypted message to the receiving computer. The receiving computer will decrypt the message using the sending computer's known public key. If the content of the decrypted message is equal to the sending computer's public key, the digital signature has been successfully verified. In order to digitally sign longer messages, it is useful to hash the entire message first, encrypt it with the sender's private key, and then transmit it to the receiving computer for decryption and verification. Several methods are available, the preferred method here is the Elliptical Curve Digital Signature Algorithm (ECDSA), a variant of RSA.

A third type useful computer cryptography is blockchain. This is a secure system to record transactions that is distributed in a great number of processing nodes, so large that defeating encryption is not viable. Each object of information that is encrypted using blockchain typically contains a cryptographic hash of the previous block, a timestamp and transaction data. By design, a blockchain is inherently resistant to modification of the data. It is an open, distributed computer ledger that can record transactions between two computers efficiently and in a verifiable and permanent way. For use as a distributed ledger, a blockchain is typically managed by a peer-to-peer computer network collectively adhering to a protocol for inter-node communication and validation of new blocks. Once recorded, the data in any given block cannot be altered retroactively without the alteration of all subsequent blocks, which requires collusion of the network majority.

In the present application, blockchain may be is useful to record transactions of information between the computers of data subjects, identity verifiers, data providers and the trusted data controller, as well as giving the data subject the possibility to tailor consent and viewing rights for its personal data via the use of smart contracts, a feature of blockchain. Smart contracts allow the data subject to specify via its computer who and whose computers can see the personal data and the data of interest, which categories of data can be seen and by whom, which can be written and by whom, which actions can be authorized depending on the underlying data of interest, and to globally or selectively grant or remove consent and computer access rights.

A fourth cryptographic method is the Secure Hash Algorithm, such as SHA-256, SHA-512 or any of their successors. This is a widely used mathematical function which encrypts an expression into an encrypted version with a higher level of security than asymmetric keys. In the current state of the art, brute force attacks to revert a hashed number take significantly longer than the time taken to revert a number encrypted with a public key. In the present disclosure, hashing may be used to transform the data subject's anonymous identifier.

These four systems of computer cryptography—symmetric key, asymmetric key, blockchain and hashing—may be usefully combined in the present invention. Other encryption features such as session keys, key rings, temporary keys and tokens as well as any other encryption system may be used as well.

Useful in understanding embodiments of the invention is the concept of consent. Consent is the explicit, specific and informed authorization of the data subject to identify the parties that are authorized to access the subject's personal data and data of interest; to authorize the purposes for which the data is used and which may survive consent revocation; to identify the various categories of data that may be accessed and processed, depending on the nature and consequent authorization level of the various receiving parties; and to determine the length of time that the data may be stored and processed by the receiving computer. The right to consent includes the right to revoke consent, with the consequence that all personal data and all data of interest originating with the data subject must be deleted by all receiving computers included in the consent revocation order. Embodiments of the inventive computer systems described herein employ this concept of consent and allow for procedures to change consent.

A form of consent includes a request for data transfer, as defined in the EU General Data Protection Regulation which allows a data subject to request that its personal data stored at a data controller computer server be transferred or copied to another data controller computer server. In the present application, it is the trusted data controller and its computer server which are the receivers of the data transferred under a data transfer request issued by the data subject.

Reports are documents produced by the trusted data controller using personal data of interest located in its computer server and in its application database, but in a way which excludes or hides the name of the data subject or any personal identifiers. Reports use statistics, data science and Big Data methods. Reports extract new valuable knowledge by calculating and inferring relationships between the elements obtained in the personal data of interest. Useful fields are advertising, marketing and selling goods and services, finance, insurance and medicine, among others. In medicine and health care, useful subfields are diagnosis, smart prescription, the ranking of drugs and treatments in terms of their effectiveness, efficacy and safety, the identification of side effects, adverse reactions and drug interactions, the cost/benefit ratio of drugs, medical devices and treatments, all in terms of patient attributes such as age, sex, genetic characteristics, severity of disease, the presence or absence of multiple diseases, the administration of multiple drugs, drug compliance, addictions, intolerances, allergies, vaccinations, microbiome and lifestyle. Reports are also useful to identify cohorts of patients sharing desirably homogenous or heterogenous characteristics as candidates for clinical trials.

Reports use all the information available at one point in time in the trusted data controller's application database containing information of interest of the entire population of data subjects. When the personal data and the data subject's information of interest are obtained by consent, future consent revocations do not affect reports, as they survive consent revocation under the original consent terms. This concludes the description of the entities and functions useful in the present disclosure.

Description of the invention. The present disclosure solves the privacy issues inherent in large-scale interne communications by replacing the data subject's name and personal identifiers in data communications between computers with an anonymous identifier, while still permitting the trusted data controller computer server to absolutely confirm the identity of the anonymous data subject and correctly transmit anonymized data of interest to the owning data subject's personal computing device. This allows sensitive personal data to be searched, collected, stored and processed without the trusted data controller computer server storing the name identity of the data subject and thus annuls the risk of abuse and breach of privacy characteristic of many internet-based communications and computer systems. In the field of health care, this enables the development of electronic health record (EHR) systems which are inherently private.

The system and method described require a data subject with a personal computing device running a personal software application, one or more data providers each running data exchange software applications in their computer servers and a trusted data controller running a data exchange software application in its computer server. The computers of all three participants include a cryptographic software module capable of creating cryptographic keys and of encrypting and decrypting messages. Each of the three software applications are configured to securely communicate and to exchange data with the two other software applications. By secure communication it is understood that computer cryptographic means are employed to ensure that only authorized communications take place in the manner described in the present disclosure. Usefully, the data subject's anonymous identifier will be used as an encryption key or as part of an encryption system in the present disclosure.

In one embodiment—the general embodiment—any cryptographic means employed by the cryptographic software module running in the computer systems of all participants which can securely encrypt the anonymous identifier and the data transmitted so that it can only be decrypted by the rightful receiving computer system are useful.

In another embodiment—the asymmetric key embodiment—cryptographic means use a public key/private key asymmetric cryptographic system employed by the cryptographic software module running in the computer systems of all participants. These means can securely encrypt the anonymous identifier and the data transmitted so that it can only be decrypted by the intended receiving computer system holding and using the appropriate keys. To authenticate communications between the personal computing device and the data provider computer server or the trusted data controller computer server, the anonymous identifier may be used in a digital signature procedure. A digital signature ensures that each computer receiving data is certain of the identity of the sending computer, that it cannot be claimed that the sending computer did not originate the data and that the data exchange is confidential. Therefore, the anonymous identifier, used as the public key in an asymmetric key encryption system, is also an authentication key and an encryption key. The implementation and use of these methods are known in the cryptography community and only salient inventive aspects will be described in the present disclosure.

In order to make communications and processing even more secure, a third embodiment adds hashing functionality to the second embodiment, so that both hashing and asymmetric keys are used to encrypt the data subject's anonymous identifier and transmitted data.

The personal computing device of the data subject can be, for example, a smartphone or a tablet. A personal computer or a personal account in a server computer can also be used but being less personal devices, they are less adequate to these tasks. Notably, a personal account in a server system may require a user defined login username and a system password, which may be data known to the data controller and thus may allow the data subject's personal data to be associated with a personal identifier. In certain computer systems, a password can be reset by a system administrator allowing immediate access to personal and identifiable data by the administrator. The invention however is not restricted to smartphones or tablets, and any device to be developed in the future which has sufficient computing power and is both within reach and under the control of the data subject, is suitable.

To prevent access to conventional login credentials, such as username and password, by a data controller or by a systems administrator, through the fact that they do not exist, is an important advantage in terms of personal data protection and security in the present application. To execute the user's login registration process in a central server by means of an anonymous identifier or encrypted anonynymous identifier, using a personal software application running in the data subject's personal computing device, increases that protection and security.

The data subject personal computing device may be configured to perform the steps described herein by means of a personal software application downloaded into the personal computing device from a website or from an app distribution service such as Appstore or Google Play. In all cases the personal software application is provided by the trusted data controller. The purpose of this personal software application is to collect in a single computing device personal information pertaining to the data subject which is usually distributed in a very large number of data provider computer servers.

The computer server systems described herein include computer servers operated by the data providers and by the trusted data controller and they will generally be server systems with considerable computing power, storage and communications capabilities. Data is processed by the data provider by means of its data exchange software application stored in the one or more data provider computer servers. Data is processed by the trusted data controller by means of its data exchange software application stored in the trusted data controller computer server.

All computer systems in the present invention comprise a processor, a memory capable of storing programme instructions, communications subsystems, storage media, input devices such as a keyboard, mouse, pointer, tactile screen, microphone or camera, and output devices such as a display screen and a loudspeaker. The computer systems are able to communicate with each other using private or public telecommunications networks, but the public network is preferred and the preferred medium is the internet.

Computer operations in the present disclosure include manual steps and automatic steps. The manual operations are those where data is entered by a data subject setting up the personal software application in its personal computing device. During installation of the personal software application, the data subject enters the personal identification data by which the data provider computer server will be able to identify the data subject's health data. This can be the name or personal identifiers, or both. Optionally, the data subject also enters a consent statement and a data transfer request, as well as any other indications needed for establishing user preferences or data required for subsequent programme operation and which will vary depending on the specific functional requirements of the software applications.

Other manual tasks by the data subject include the selection of menu options in the personal software application during use.

All other tasks described herein are automatic tasks and they occur automatically under computer programme control to manage all data processing in the data subject's personal computing device and in the computer servers of the one or more data providers and of the trusted data controller and the communications and data exchanges between them.

The present invention is directed at enabling a sequence of requests, retrieval, storage, processing and exchange of data under the control of computer programmes executed on the personal data of the data subject in its personal computing device, in the one or more data provider computer servers searching, anonymizing and transmitting anonymized data of interest relating to the data subject, and in the trusted data controller computer server receiving, storing and accumulating the anonymized data of interest and returning it to the personal computing device of the anonymous data subject.

The trusted data controller computer server does not store any information on or pertaining to the name or personal identifiers of the data subject, nor any electronic address information, such as the cell phone number, electronic address or internet address of the personal computing device of the data subject. Not storing this data is an efficient way of preventing computers from accidently, negligently or maliciously to breach the data subject's personal data and associated privacy rights. Therefore, data items identifying the data subject, such as name or personal identifiers must not be communicated to the trusted data controller computer server, nor means be given to the trusted data controller computer server to identify the data subject by name, personal identifiers, login username or system password. Consequently, computers in the present invention are not configured to identify data subjects using a conventional login username and system passwords. A system password is a confidential code usually chosen by the data subject which is stored in the computer system of any data controller managing the data subject's computer user account.

Instead, the personal software application in the personal computing device uses a unique number to identify the data subject—the anonymous identifier. The number is of such dimension that the probability of at least two human beings sharing the same anonymous identifier and different computers storing and using the same anonymous identifier to identify more than one human being is considered as close to zero. The anonymous identifier is therefore also an identification key of the data subject.

There are at least two ways that a computer system can generate the anonymous identifier, both employing the cryptographic software module running in the personal computing device. The first is by generating a single complex random number and it will be used in cryptographic communications between all computer systems. They will use the data subject's anonymous identifier also as the cryptographic key in a symmetric key cryptographic system. The second way is to use asymmetric encryption key cryptographic systems. In a first step, the cryptographic software module generates a random number, which will be the data subject's private cryptographic key. From the private key, the cryptographic software module mathematically derives the public cryptographic key, using for instance the published method of the Elliptical Curve Digital Signature Algorithm. This may be used for encrypted communications between the computer systems of the data subject, the one or more data provider and the trusted data controller.

The data subject's public cryptographic key will also be its anonymous identifier, but its use will be different from convention, as it will remain confidential and only known to the computers of the data subject and of the trusted data controller. Since the anonymous identifier can be an identification key, an authentication key and an encryption key, it must be severely guarded, through encryption, by generating the encrypted anonymous identifier.

For greater security, the data subject's original anonymous identifier may be hashed by the data subject's cryptographic software module in the personal computing device, so that it may be transmitted to data providers in a way which hides the original anonymous identifier. In this embodiment, when the data subject installs the personal software application in its personal computing device, the installation process is configured to send the original anonymous identifier to the trusted controller computer server. On receiving it, the trusted data controller computer server applies the hashing algorithm to the original anonymous identifier and obtains the hashed anonymous identifier, which it stores in the data subject's entry record in its user registration database. In subsequent transmissions of information of interest pertaining to the data subject, between the data provider computer server and the trusted data controller computer server, the subject's data is identified by the former by the subject's hashed anonymous identifier. On receiving it, the trusted data controller computer server searches its data registration database for that hashed anonymous identifier, and on finding a match, reads the data subject's original anonymous identifier in the same record and stores the received data of interest under the identity of that anonymous identifier.

In all cryptographic embodiments, it is desirable that the encrypted anonymous identifier only be decrypted by the trusted data controller computer server. Thus, the encrypted anonymous identifier and the cryptographic keys necessary to decrypt it will be known only to the cryptographic software modules running in the data subject's personal computing device and in the trusted data controller computer server and will be secret to all other computers, such as the data provider computer servers.

Given the existence of numerous encryption and data transformation methods and in order to simplify the present disclosure, the expressions "encrypt", "hash", "encrypted anonymous identifier", "encrypted data", "digitally signed" (and their counterparts "decrypt", "decrypted anonymous identifier", "decrypted data", "digital signature verified") will now be used without continuous reference to the encryption or data transformation method used, using only the words "encrypted" and "decrypted" except when the context so requires it. Nevertheless, a person with reasonable skill in cryptography will be able identify the most appropriate method for each use.

The present disclosure will now describe the operation of the present system and method to handle anonymized personal data. This system and method are used to search and obtain identified personal data related to a data subject, comprising the downloading and installing of a personal software application in a personal computing device and the data subject entering the at least name or personal identifiers or both and the optional consent, data transfer request and user preferences. The cryptographic software module is also downloaded and installed and generates an anonymous identifier for the data subject as well as an encrypted version, the encrypted anonymous identifier. The personal software application sends the data and the encrypted anonymous identifier to the one or more data provider computer servers, which search and obtain the data subject's information of interest stored in their one or more application databases, remove all personal identifiers so as to de-identify and anonymize the information and the data subject, transmit the anonymized information and encrypted anonymous identifier to a trusted data controller computer server, which decrypts and validates the data subject's anonymous identifier and stores, processes and subsequently returns the anonymized data to the personal computing device of the anonymous data subject.

In more detail, right after installation, the personal software application in the personal computing device contacts all participating data provider computer servers likely to have personal data relating to the data subject. Data provider computer servers run a data exchange software application configured to securely communicate with the personal software application. A data provider computer server receives the data from the personal software application, including the at least name or personal identifiers or both and the optional consent, data transfer request, user preferences and encrypted anonymous identifier, and by means of the personal identifiers, searches its application databases for personal data of interest pertaining to the data subject and obtains identified data. On finding it, the data exchange software application removes any and all personal identifiers from the identified data of interest: name, full date of birth, address, personal identification numbers, cell phone number, e-mail address, internet address and the like, to de-identify and anonymize the data subject's data of interest. These actions are carried out by all data provider computer servers contacted by the data subject's personal software application.

The data exchange software application in each data provider computer server then adds to the anonymized data of interest the data subject's encrypted anonymous identifier and the optional information and transmits it to the data exchange software application in the trusted data controller computer server.

The trusted data controller computer server receives the data transmission and verifies whether it refers to a new or existing data subject. This is done by the data exchange software application decrypting the data subject's encrypted anonymous identifier and searching the data subject's decrypted anonymous identifier in the user registration database of the trusted data controller computer server.

If it does not find it, the data subject is new and the data exchange software application opens a new entry for the data subject by recording its anonymous identifier, the optional consent, data transfer request and preferences in the user registration database and the transmission metadata (e.g., timestamp of the communication, originating data provider identity and address, etc) in the transmissions log file, of the trusted data controller computer server. If it finds it, the data subject is therefore an existing one and the data exchange software application records the transmission metadata in the transmissions log file in the trusted data controller computer server. Thereafter and in both cases, the data exchange software application records the anonymous identifier and the anonymized data of interest in the application databases of the trusted data controller computer server.

The transmission of anonymized data from the data provider computer server to the trusted data controller computer server will occur periodically, whenever new personal data pertaining to the data subject is entered into the application databases of the one or more participating data provider computer servers. The data exchange software application in the data provider computer server will be configured to identify the new data for subsequent transmission to the trusted data controller computer server. This periodic transmission will occur for as long as the data subject does not revoke its consent to personal data access and processing, via its personal software application, a revocation which will be disseminated to all servers participating in the present computer and data exchange system. Over time, the data provider computer server will continue to transmit new data and the trusted data controller computer server will accumulate a substantial amount of anonymized data of interest, identified solely by the data subject's anonymous identifier.

The method by which the trusted data controller computer server returns anonymized data of interest to the personal software application of an anonymous data subject will now be described. The personal software application in the personal computing device and the data exchange software application of the trusted data controller computer server establish communication over the communications network and the data exchange software application transmits the anonymized data of interest to the personal software application thereby returning the personal data and information of interest to the anonymous data subject's personal computing device.

This is achieved by means of a communications session which is always initiated by the personal software application in the personal computing device of the data subject, connecting to the known electronic address of the trusted data controller computer server. The data exchange software application in the trusted data controller computer server must wait for the communications session to be started by the personal software application, the trusted data controller computer server being prevented from initiating such a communication session, as it does not have any contact elements, numbers or addresses.

Secure communications between the data subject personal computing device and the trusted data controller computer server are achieved by the personal software application transmitting a data exchange request to the trusted data controller computer server, which may be validated in two different ways. The personal software application and the cryptographic software module may send the request and the data subject's anonymous identifier in a digitally signed format, where the anonymous identifier is encrypted with the private key of the cryptographic software module, to which the data subject's public key is then appended. The cryptographic software module in the trusted data controller computer server decrypts the message using the public key which was appended to the message. If the content of the decrypted message is the same as the public key used to decrypt it, then the digital signature and the message are validated.

In a second method, a request identified exclusively by the anonymous identifier of the data subject may be validated by the data exchange software application in the trusted data controller computer server, which receives it and compares it with like entries in the user registration database in the trusted data controller computer server. If a match is found, this is a confirmation that a valid request has been received and that the stored anonymous identifier and the received anonymous identifier do correspond to the same anonymous data subject.

Following either of these two verification methods, the data exchange software application in the trusted data controller computer server is sure to return the anonymized data of interest to the personal computing device of its rightful owner data subject. This method and system provide computers of the present invention with a level of operational security with regards to privacy rights which was until now absent or deficient in internet-based communications and computer systems.

Selecting the asymmetric key cryptographic system to generate the anonymous identifier and to provide asymmetric cryptographic key pairs to all computers in the present invention—of the data subject, of data providers and of the trusted data controller—as well as using a hashing function to transform the original anonymous identifier satisfies with greater efficiency and security the present deficiencies in existing computer systems with respect to the risk of abuse of privacy related to personal data.

In this way, when the personal software application first contacts the one or more data provider computer servers and transmits the subject's data entered during installation of the personal software application in the data subject's personal computing device, the data subject's original anonymous identifier will be hashed or encrypted and will thus still serve as a unique identifier for the data subject, but without revealing the original anonymous identifier. Consequently, the data provider computer server is unable to associate the name and personal identifiers of the data subject, which are stored in and known to that data provider computer server, with the data subject's original anonymous identifier. This ensures the confidentiality of the data subject's public key, which is also its anonymous identifier. When the data provider computer server transmits the anonymized data of interest and the encrypted anonymous identifier to the trusted data controller computer server, the trusted data controller computer server uses its private cryptographic key to decrypt the data subject's original anonymous identifier. In this way, it will be impossible for any party using a computer or for any computer, except the data subject and the trusted data controller and their respective computers, to know the data subject's anonymous identifier and to use it to illegally or maliciously retrieve the data subject's data of interest from the trusted data controller computer server, and then use the data in breach of the data subject's privacy rights. Even if the intercepting computer is able to collect a considerable amount of information of interest, in the absence of the data subject's name or personal identifiers, it is not identifiable or relatable to a known person.

When the personal software application in the personal computing device and the data exchange software application in the trusted data controller computer server communicate and transmit data, the communications session is in most cases initiated automatically, according to default preferences existing in the personal software application, typically daily, weekly or monthly or even longer periods. This frequency depends on the nature of the data. In the case of health care, an adequate default value is monthly, but if a person is hospitalized, a more appropriate interval is a daily update. For this reason, the data subject can change the update frequency in its personal software application to a desired interval or even select an immediate update option button in the personal software application.

For timed updates, the frequency will be communicated by the personal software application to the data exchange software application in the one or more data provider computer servers. For an immediate update, the request will go directly to the data exchange software in the trusted data controller computer server, for retrieval of recently acquired data of interest.

In all embodiments, during the communication of messages containing anonymized data of interest from the one or more data provider computer servers to the trusted data controller computer server, and the registration of a new anonymous data subject in the trusted data controller user registration database, and the communication of anonymized data of interest from the trusted data controller computer server to the personal computing device of the anonymous data subject, the data subject never uses and is never required by the personal software application to use a conventional user-defined username and a system password, which would undesirably identify the data subject. Access to the personal software application may be secured by the use of a local screen-lock password, stored exclusively in the personal computing device, or by biometric means such as a fingerprint or facial recognition locally present in personal computing devices. Identity verification is only and always by means of the anonymous identifier.

Several software applications exist to collect a data subject's personal data, and this is the case in health care and electronic health record applications. However, such applications are normally associated with a health care provider or an insurance company and do not cover all data providers where a data subject's records may be stored. The present application discloses a method and system where personal data may be universally collected, from wherever it may be stored in a multiplicity of participating data provider computer servers and then forwarded in an anonymized form and returned in an organized, easy-to-understand way to the data subject's personal computing device.

Returning the data subject's information of interest in a communications session always initiated by the data subject's personal software application and identified by the anonymous identifier solves the anonymization reversibility/irreversibility paradox and allows the trusted data controller computer server to securely communicate with the data subject personal computing device and to transmit valuable personal information and scientific knowledge derived from the large scale processing of personal data, without knowing the data subject's name, cell-phone number, e-mail address or personal computing device address.

In one embodiment of the invention a parent may store a child's information of interest in the parent's personal computing device and then allow the child's information to be removed from the parent's device and transferred to the child's device, for example on reaching a certain legal age.

In another embodiment of the invention applicable to health care, the data subject may, by means of the personal software application, designate a health care professional who will be authorized to receive the data subject's medical records. To achieve this, the data subject causes the personal software application to send the data subject's anonymous identifier and the health care professional's name to the data exchange software application in the trusted data controller computer server. The health care professional will be running an application in its computer which is connected over a communications network to the same data exchange software application. This application in the trusted data controller computer server will receive the data subject's request and anonymous identifier and the name of the health care professional. It will then retrieve the data subject's medical records from its application data base and send them to the computer connected the health data exchange software application whose user identity matches the name of the health care professional designated by the data subject. Health care records can therefore be shared by the data subject with the chosen health care professional, and the data sharing occurs without the trusted data controller computer server knowing the name of the data subject.

In another embodiment, the personal software application is configured to detect the presence of the same personal software application installed in other personal computing devices of other data subjects who are nearby, and, via Wi-Fi or Bluetooth, the personal software applications broadcast, receive and store each other's encrypted anonymous identifiers. This embodiment is particularly useful in epidemic situations, where there is a need to know the identification, preferably anonymous, of everyone who was in proximity of an infected person, so as to contact everyone concerned and send them relevant advice to their personal software applications.

Another embodiment involves the personal software application, during its installation, first contacting a known identity verification computer server, for the purpose of absolutely guaranteeing that the data subject is indeed the person indicated by its name, and not another person trying to impersonate the data subject to illegally obtain the data subject's personal information of interest. Only upon identity verification, as described for instance in patent application PT 115.304, will the personal software application be allowed to successfully conclude its installation in the personal computing device, by an identity verification computer server message permitting it. The identity verification computer server may also store the list of data provider computer servers likely to store information of interest of the data subject. In this case, the identity verification computer server may be programmed to ensure the distribution of the data subject's user registration data to all participating data provider computer servers. This frees the personal computing device from being tied down to a data subject registration process which may be lengthy. This possible role for the identity verification computer server does not substantially alter the present disclosure, as after verifying the data subject's identity, it transmits data to the data provider computer servers in exactly the same manner as is described herein with respect to data exchanges and transmissions between the personal computing device and the one or more data provider computer servers. The means to control the secure exchange of data in this embodiment may include asymmetric encryption keys, digital signatures, hash functions and blockchain.

Another embodiment involves the possibility to recover a data subject's information of interest, in the case of loss, destruction, theft, re-installation or upgrade of the data subject's personal computing device. Here, a new personal computing device may be used, the personal software application downloaded and installed again, a new anonymous identifier being generated and the data subject's computer user account recovered, re-initiating the data flow process via the one or more data provider computer servers and allowing the previously existing information of interest stored in the trusted data controller computer server to be re-associated with the new data subject anonymous identifier, without transmitting or revealing the name identity or personal identifiers of the data subject to the trusted data controller computer server. Means to this recovery include a computer storing prior to the recovery process at least the data subject's name, personal identifiers and the original encrypted anonymous identifier. Therefore, data provider computer servers and identity verification computer servers may be useful in this recovery.

SUMMARY DESCRIPTION OF THE DRAWINGS

In the drawings, like numbers refer to like elements and features in the description.

DETAILED DESCRIPTION OF THE DRAWINGS

Figure 1A:
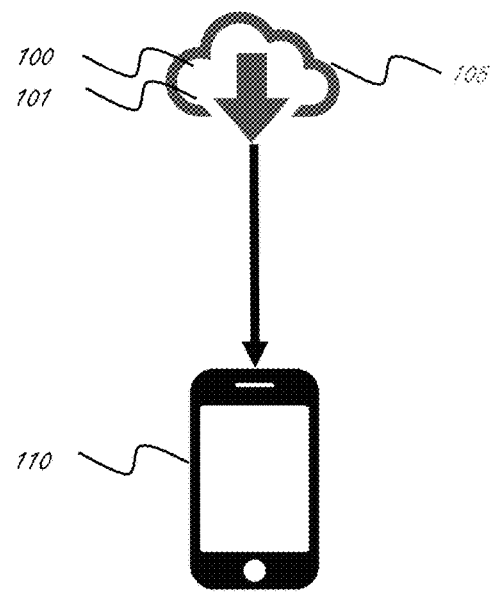
FIG. 1a is a block diagram of a system architecture used to download and install a personal software application into a personal computing device, according to an example embodiment of the present disclosure.

In FIG. 1a, the data subject connects its personal computing device to the public mobile digital communications network such as the GSM system, for example, or the internet, or any other communications network—collectively the communications network. Then the data subject downloads and installs a personal software application 100 a cryptographic software module its personal computing device 110. The personal software application 100 and the cryptographic software module 101 are downloaded from an appropriate software distribution system 105, such as App-Store or Google Play, or an internet web site, to which the data subject connects using its personal computing device 110. The data subject is aware of the personal software application 100 through word of mouth, social networks or a conventional advertisement, which identify it as a personal software application published by a trusted data controller to securely collect personal data pertaining to the data subject.

Figure 1B:
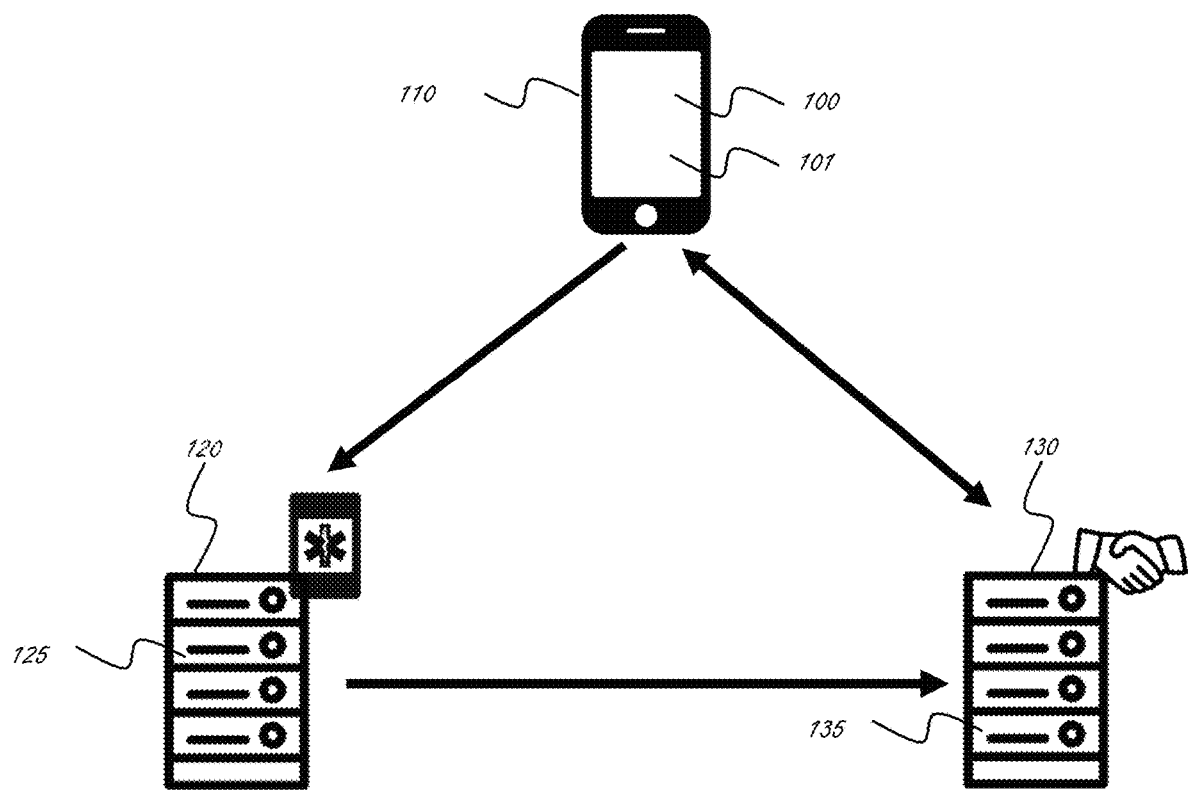
FIG. 1b is a block diagram of a computer system architecture used to connect a personal computing device, a data provider computer server, a trusted data controller computer server and to establish communications between all of them, according to an example embodiment of the present disclosure.

In FIG. 1b, once downloading has occurred, the installation of personal software application 100 takes place and the data subject enters at least its name and may enter other personal identifiers and consent terms. The personal software application 100 generates an anonymous identifier as well as its encrypted version using the trusted data controller's known public key.

The personal software application 100 of the personal computing device 110 sends the entire data message—data entered by the data subject and the encrypted anonymous identifier—to the one or more data providers computer servers 120, known to the personal software application, which are likely to hold personal data relating to the data subject. The one or more data provider computer servers 120 comprise a data exchange software application 125, configured to securely exchange data with the personal software application 100 and to store it.

The data exchange software application 125 searches the application databases of the data provider computer server 120 and extracts the information of interest related to the data subject. The data exchange software application 125 anonymizes the information of interest by removing name and personal identifiers and replacing them with the data subject's encrypted anonymous identifier and transmits it to the trusted data controller computer server 130. This server 130 also comprises a data exchange software application 135 configured to securely exchange data with the data exchange software application 125 in the one or more data provider computer servers 120. This extraction, anonymization and transmission of data then occurs periodically under control of the data exchange software application 125 running in the one or more data provider computer servers 120.

The data exchange software application 135 in the trusted data controller computer server 130 receives the data message from the data exchange software application 125 in the data provider computer server 120, including the anonymized information of interest and the encrypted anonymous identifier.

The data exchange software application 135 decrypts or validates the data subject's anonymous identifier and stores the anonymized information of interest. At regular intervals, the data exchange software application 135 of the trusted data controller computer server 130 transmits the newly received information of interest to the personal software application 100 in the personal computing device 110 of the data subject who is identified by the same anonymous identifier as the anonymized information of interest.

Figure 2:
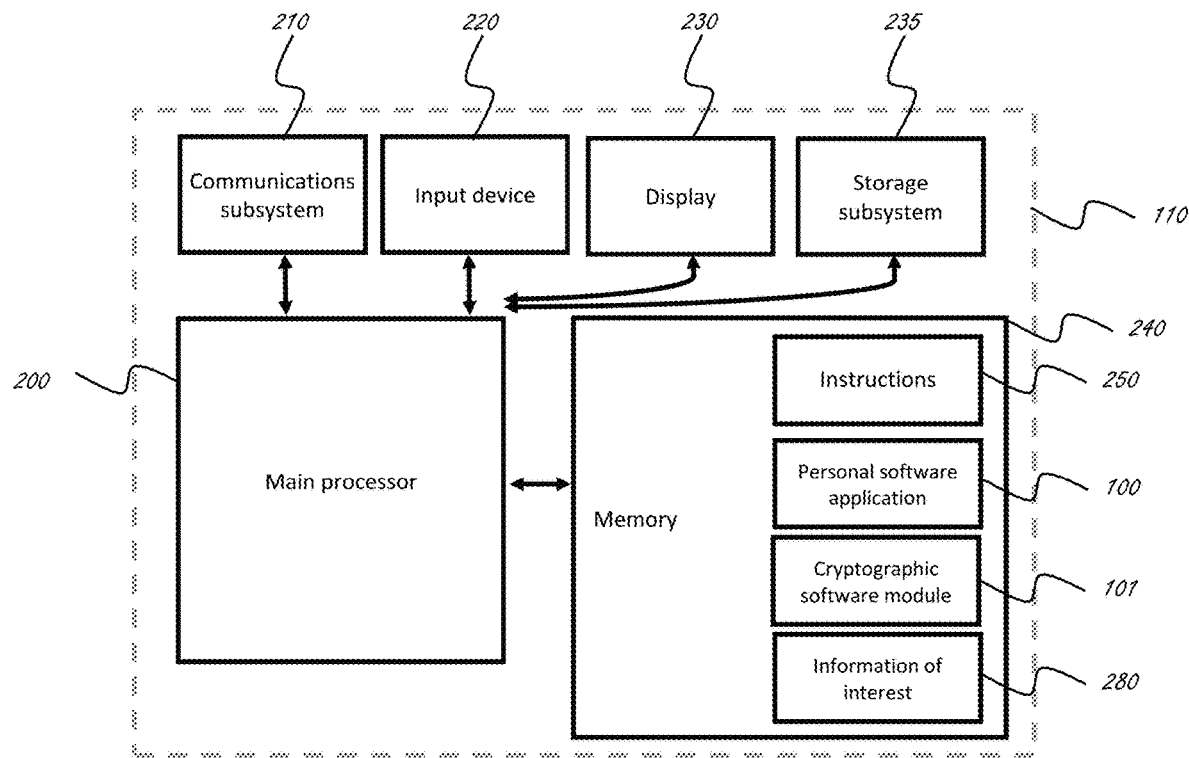
FIG. 2 is a block diagram of a personal computing device, according to an example embodiment of the present disclosure.

In FIG. 2, the personal computing device 110 is illustrated in terms of its essential hardware and software components. Personal computing device 110 comprises a main processor 200, a communications subsystem 210 designed to communicate over the communications network with all data provider computer servers 120 and trusted data controller computer server 130, input device 220, a display 230 and storage media subsystem 235 storing computer programmes and data. The processor 200 interacts with the memory 240 containing computer programmes and data retrieved from the media storage subsystem 235. The processor 200 loads into the memory 240, as needed, the programme instructions 250, the personal software application 100, the cryptographic software module 101 and data from files and application databases storing the information of interest 280 received from the trusted data controller computer server 130.

Figure 3:
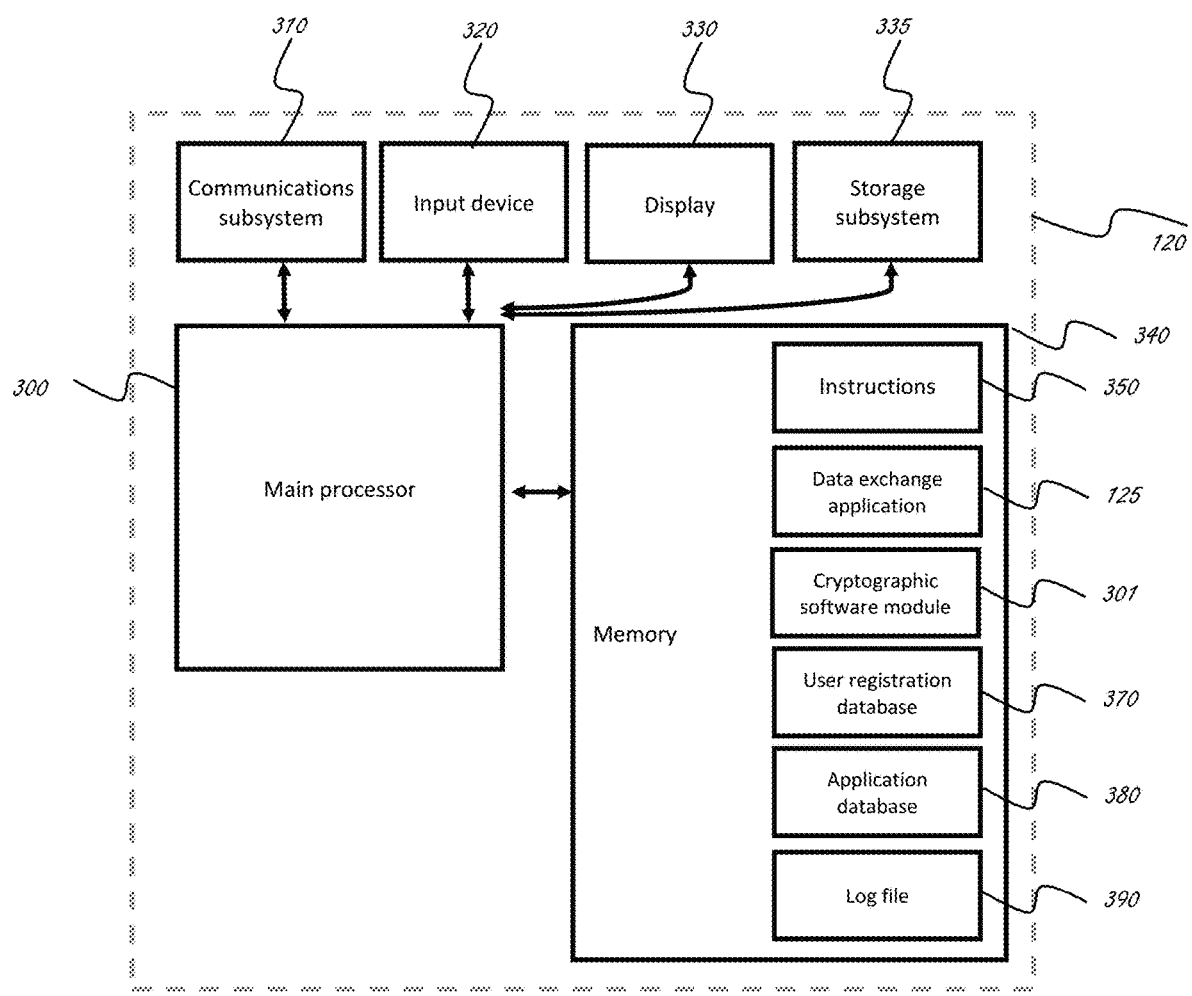
FIG. 3 is a block diagram of a data provider computer server, according to an example embodiment of the present disclosure.

FIG. 3 illustrates the essential hardware and software components of the one or more data provider computer servers.

The one or more one data provider computer servers 120 comprise a main processor 300, a communications subsystem 310 designed to communicate over the communications network with all the data subject personal computing devices 110 and trusted data controller computer server 130, input device 320, a display 330 and storage media subsystem 335 storing computer programmes and data. The processor 300 interacts with the memory 340 containing computer programmes and data retrieved from the media storage subsystem 335. The processor 300 loads into the memory 340, as needed, programme instructions 350, the data exchange software application 125, the cryptographic software module 301, the user registration database 370, the application database 380 containing the identified personal data of the data subject and the transaction log files 390 containing the communications metadata from all data exchange sessions comprising at least the identity of the originating computer and the timestamp of the data exchange event.

Figure 4:
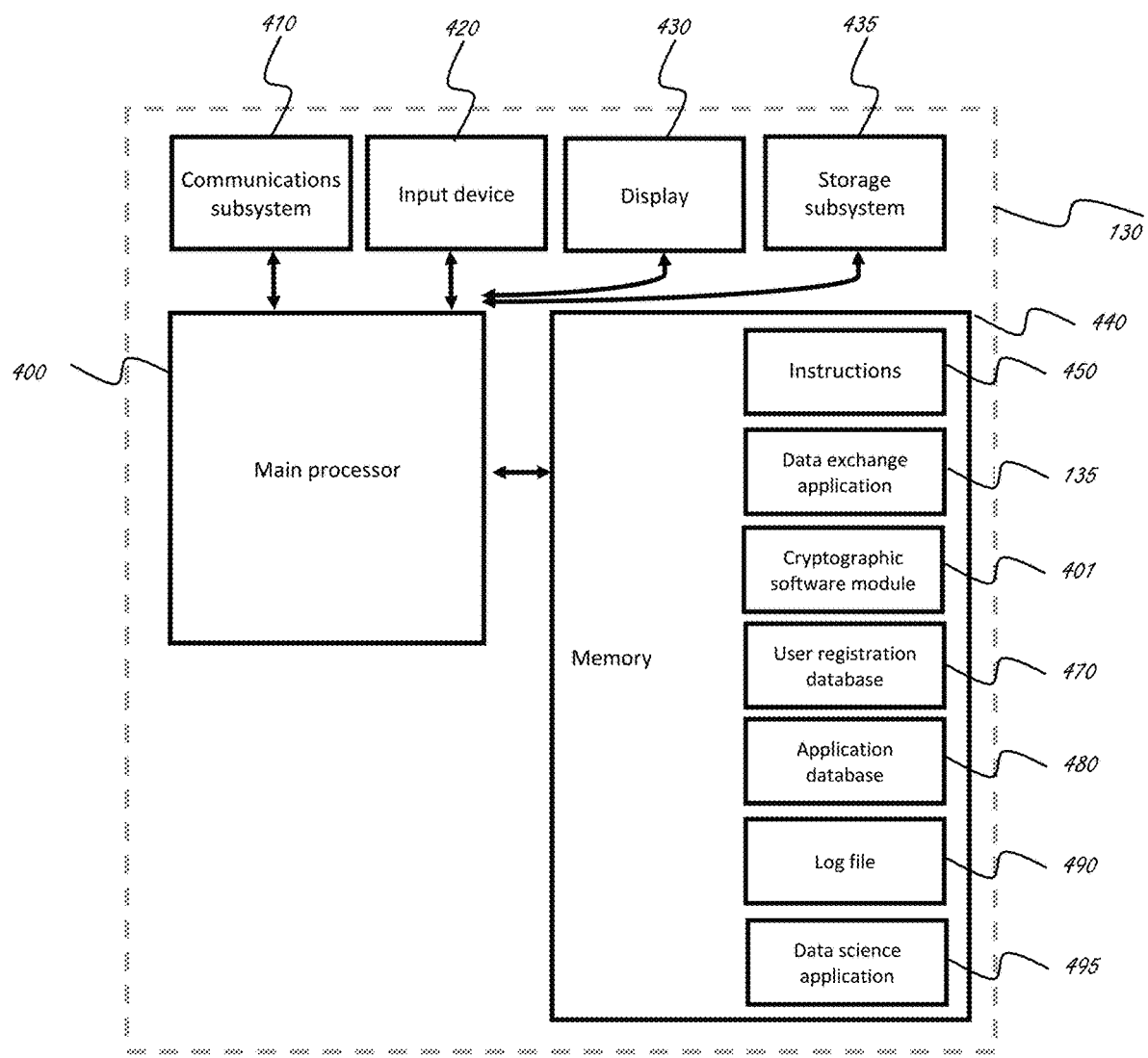
FIG. 4 is a block diagram of a trusted data controller computer server, according to an example embodiment of the present disclosure.

FIG. 4 illustrates the essential hardware and software components of the trusted data controller computer server.

The trusted data controller computer server 130 comprises a main processor 400, a communications subsystem 410 designed to communicate over the communications network with the data subject personal computing device 110 and data provider computer servers 120, input device 420, a display 430 and storage media subsystem 435 storing computer programmes and data. The processor 400 interacts with the memory 440 containing computer programmes and data retrieved from the media storage subsystem 435, The processor 400 loads into the memory 440, as needed, programme instructions 450, the data exchange software application 135, the cryptographic software module 401, the user registration database 470, the application database 480 containing the anonymized information of interest of the data subject, the transaction log files 490 containing the communications metadata from all data exchange sessions comprising at least the identity of the originating computer and the timestamp of the data exchange event and the data science software application 495. In use, it is this data science software application which will process the anonymized information of interest stored in a very large scale in application database 480 to produce the previously described reports from which new information and new knowledge will be derived. These reports will have a significant economic value, and in certain fields, such as health care, a considerable public interest.

The operation of the computer systems in FIGS. 1a, 1b, 2, 3, and 4 will now be explained in detail through the flowcharts in FIGS. 5 and 6. Programme steps are numbered by numerals belonging to the 500 and 600 series, but reference is also made to elements of the preceding figures.

Figure 5:
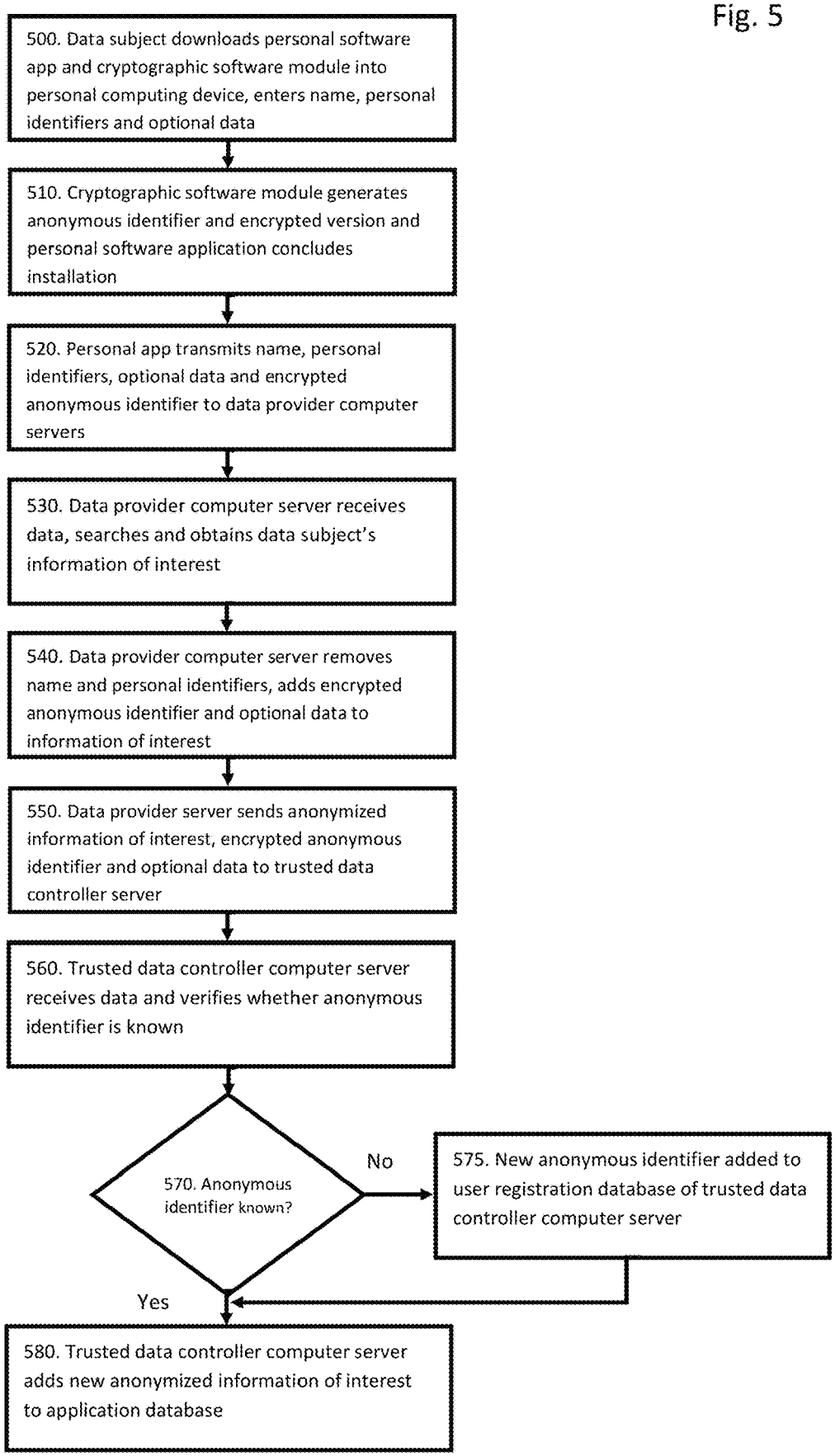
FIG. 5 is a flowchart of the programme flow starting with the installation of the personal software application in the personal computing device and ending with the transfer of the information of interest to the trusted data controller computer server, according to an example embodiment of the present disclosure.

FIG. 5 illustrates the process by which a data subject registers in the computer system of the present disclosure, and how data of interest is collected from the one or more data provider computer servers 120 and transmitted to the trusted data controller computer server 130. In step 500, the data subject downloads the personal software application 100 and the associated cryptographic software module 101 from a suitable app distribution service or a website 105, into its personal computing device 110. During the installation process, the data subject enters personal identification data via an input device 220 into the personal software application 100, such as name, sex, date of birth, address, postal code and personal identifiers, such as a citizen's ID card number, driver's license number, social security number or tax number—as many as may exist, and this will assist in the subsequent retrieval of personal data in the data provider computer servers.

Where the laws to protect personal data so require, the data subject indicates via the data input device 220 into the personal software application 100 its consent to the retrieval of its personal data, from whichever data provider computer server 120 it may be stored in, and transfer it to and be processed by the trusted data controller computer server 130. Typically, the personal software application 100 will have been developed and issued by a specific trusted data controller, and it will be configured to display the name of that trusted data controller on the screen of the personal computing device 110, so that the data subject is entirely clear as to whose computer system its anonymized personal data is to be transferred or copied. The data subject may also enter any preference or options data requested by the personal software application 100 using input device 220.

Once the data entry stage is concluded, in step 510 a cryptographic software module 101 in the personal computing device 110 generates an anonymous identifier and an encrypted version thereof. The anonymous identifier may be generated using a symmetric key system or an asymmetric key system, depending on the embodiment and desired level of security, but independently of the system adopted to generate it, the anonymous identifier and the encrypted anonymous identifier will always be associated to the originating data subject and identify as an identification key all personal data subsequently retrieved in the one or more data providers computer servers 120 and transmitted to the trusted data controller computer server 130.

In the general embodiment, when using a symmetric cryptographic key, the anonymous identifier may be generated to fulfil the function of an encryption key, using the Advanced Encryption Standard comprised in the cryptographic software module 101 of the personal computing device 110.

In the asymmetric key embodiment, asymmetric cryptographic keys are generated using the preferred system of the Elliptical Curve Digital Signature Algorithm. The private key will be generated randomly by the cryptographic software module 101 in the personal computing device 110 and from this private key the cryptographic software module 101 will mathematically derive a public cryptographic key. This public key will also be the anonymous identifier of the data subject. The cryptographic software module 101 then selects the generated public key/anonymous identifier and produces an encrypted version using the known public cryptographic key of the trusted data controller computer server 130, or using any of the other cryptographic or transformation methods described in the present disclosure. The public key of the trusted data controller computer server 130 is known publicly, and it is stored in the cryptographic software module 101 in the personal computing device 110. This means that if the data subject's encrypted public key is transmitted to or intercepted by other computers which do not have the means to decrypt the encrypted anonymous identifier, they will never know the data subject's original anonymous identifier. Thus, when transmitted to the one or more data provider computer servers 120 as part of the initial registration process described in this FIG. 5, data provider computer servers 120 are prevented from knowing the data subject's plaintext anonymous identifier and therefore unable to use its functionality as an identification, authentication and encryption key.

In step 520, the personal software application 100 in the personal computing device 110 contacts all participating data provider computer servers 120 holding data of interest to the data subject, such as health records, tax records, transaction records, financial records, consumer preferences—any information which by nature may be private or sensitive—and these records are stored in the application databases 380. This contact will be performed using the communications network. The electronic addresses of the data provider computer servers 120 may be written into a list stored in the personal computing device 110 and accessed by the personal software application 100, or the personal software application 100 may contact a trusted web server (not shown) from which it may retrieve the most up-to-date list of electronic addresses of participating data provider computer servers 120.

The personal software application 100 and the data exchange software application 125 in the one or more data provider computer servers 120 are configured to securely exchange data with each other. The data exchange software application 125 will have been developed by the trusted data controller. This is the first time that the personal software application 100 is contacting the data provider computer server 120.

After connection is established, the personal software application 100 transmits the data subject's name, personal identification data, personal identifiers, optional consent terms, optional data access request, optional personal preferences and the encrypted anonymous identifier, to the data exchange software application 125 in the data provider computer server 120.

In step 530, the data exchange software application 125 in the one or more data provider computer servers 120 receives the data subject's transmitted identification data and stores it in their user registration databases 370 located in the one or more data provider computer servers 120. The user registration database 370 will therefore record the data subject's name, all personal identifiers, optional consent terms, optional data transfer request, optional user preferences and the encrypted anonymous identifier.

Once this process has been concluded, the data exchange software application 125 transmits a message to the personal software application 100 that the registration process is concluded at that specific data provider computer server 120.

The personal software application 100 then selects the following data provider computer server in the list of data providers computer servers and re-initiates the user registration process at all data provider computer servers 120 until the data subject has been registered as a new user in all data providers computer servers 120 in the list.

The data exchange software application 125 searches the application databases 380 in the one or more data provider computer servers 120 and using the data subject's name and personal identifiers finds and collects therefrom all personal data of interest associated with the identified data subject.

In step 540, on finding the data of interest and placing it in the data provider computer server's memory 340, the data exchange software application 125 deletes the data subject's name and any and all personal identifiers and replaces them with the data subject's encrypted anonymous identifier. The subject's data of interest is thus stripped of any personal identification elements and is therefore anonymized and de-identified.

In step 550, the data exchange software application 125 in the one or more data provider computer servers 120 then contacts the data exchange software application 135 located in the trusted data controller computer server 130 by means of the communications network. Once contact is established, the data exchange software application 125 in the data provider computer server 120 transmits the data subject's de-identified, anonymized information of interest, the optional consent terms, optional data access and transfer request, optional user preferences and the data subject's encrypted anonymous identifier, to the data exchange software application 135 in the trusted data controller computer server 130. The data exchange software applications 125 records the transmission metadata (at least the identity of the communicating computers and the timestamp of the data exchange) in log file 390 in the one or more data provider computer servers 120.

It will be noted that the name and personal identifiers of the data subject are not transmitted to the trusted data controller computer server 130. Transmission of anonymized data of interest then occurs periodically, whenever new data of interest—new medical records, new tax records, new financial records, etc.—is acquired by the application databases 380 in the one or more data provider computer servers 120, for as long as the consent of the data subject is not revoked in the personal software application 100 and communicated to the data exchange software application 125. The data exchange software application 125 is configured to conduct this periodic search, to anonymize and to transmit the data of interest to the trusted data controller computer server 130. In order to transmit only recent information of interest, the data exchange software application 125 will refer to the metadata of the previous transmission contained in the log file 390 and only transmit information of interest acquired since that event.

In step 560, the trusted data controller server 130 receives the transmitted data from the one or more data provider computer servers 120. The data exchange software application 135 records the transmission metadata (at least the identity of the communicating computers and the timestamp of the data exchange) in log file 490 in the trusted data controller computer server 130.

On receiving the data message from the one or more data provider computer servers 120, the data exchange software application 135 in the trusted data controller computer server 130 must first read the encrypted anonymous identifier. In the general embodiment, the anonymous identifier will be decrypted by the cryptographic software module 401 using the method corresponding to the method used to encrypt it originally. In the asymmetric key embodiment, the cryptographic software module 401 reads the data subject's encrypted anonymous identifier and decrypts it using the private key of the trusted data controller computer server 130, thus obtaining the data subject's original anonymous identifier as well as its public key.

In step 570, the trusted data controller computer server 130 uses the now decrypted anonymous identifier to determine whether the data subject is new or not. The data exchange software application 135 searches the user registration database 470 located in the trusted data controller computer server 130 and compares the received anonymous identifier with the anonymous identifiers stored in the user registration database 470.

In step 575, if a match is not found, then a new entry is recorded in the user registration database 470 in the trusted data controller computer server 130, including the data subject's anonymous identifier, optional consent terms, optional data transfer request, optional user preferences and the metadata of the transmission is recorded in a log file 490 located in the trusted data controller computer server 130. The computer programme flow continues to step 580.

If a match is found or on programme flow continuing from step 575, then in step 580 the data subject is already recorded in the user registration database 470 of the trusted data controller computer server 130 and the data exchange software application 135 records the data subject's anonymized data of interest in the application database 480 of the trusted data controller computer server 130, solely identified by the data subject's anonymous identifier.

After several data transmissions events, the trusted data controller computer server 130 will store a significant amount of anonymized personal information of interest pertaining to the data subject in its application database 480. Consequently, the trusted data controller computer server 130, in the absence of any personally identifiable information about the data subject—no name, no personal identifiers, no cell phone number, no email address—has no address to contact and establish communications with the personal software application 100 in the data subject's personal computing device 110 and return its information of interest periodically obtained from multiple data provider computer servers 120. The trusted data controller computer server 130 does not have the means to contact the personal computing device 110 and re-identify the data subject and this prevents the data subject's identified personal data from being accessed by a computer through accident, negligence or malice. The disclosure presented in the following figure provides for a computer system configured to access and process the data subject's personal data in a way which does not breach its privacy rights.

Figure 6:
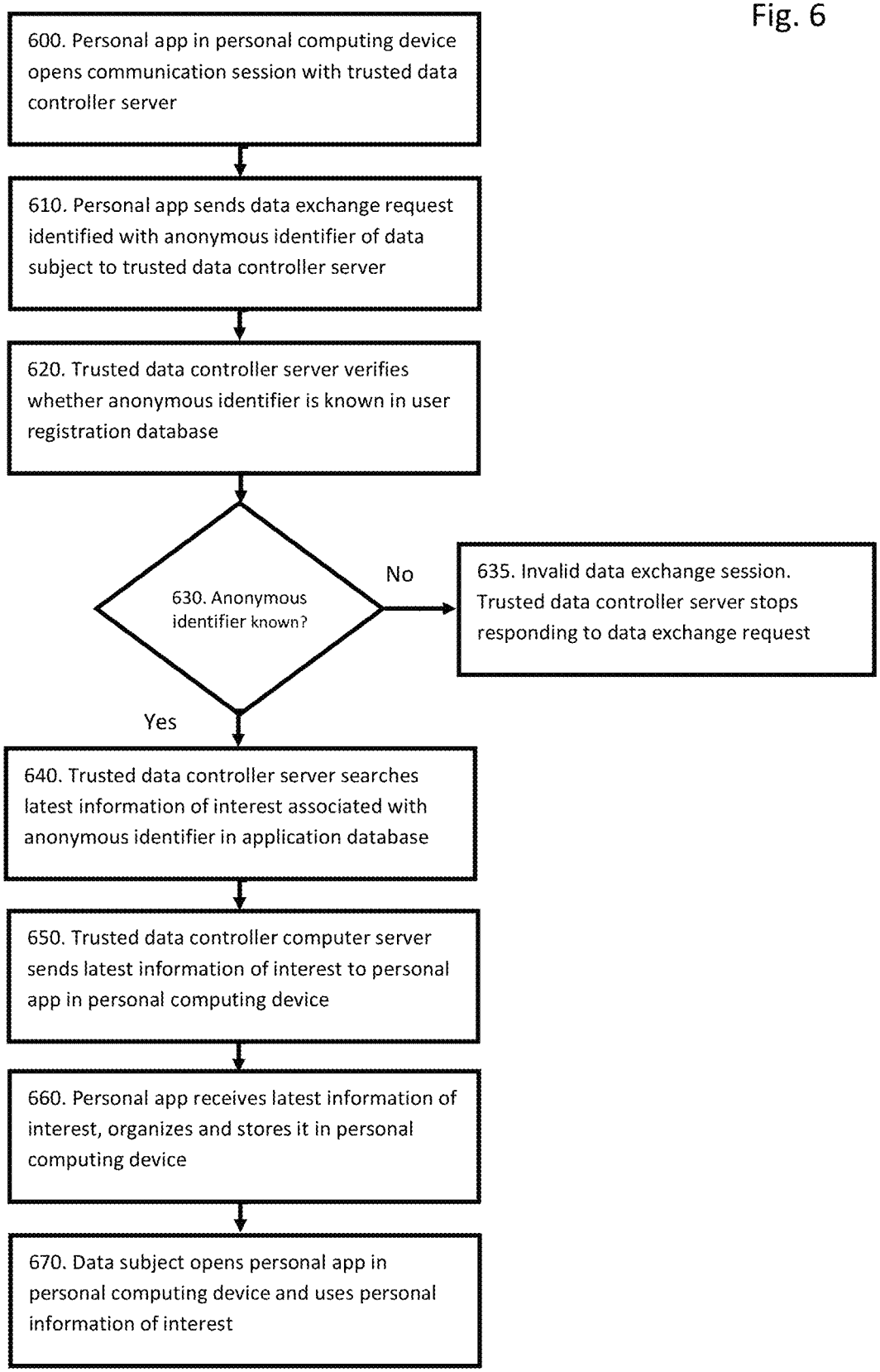
FIG. 6 is a flowchart of the programme flow starting with the data exchange request transmission by the personal software application and ending with the data subject accessing and using the personal information of interest in its personal computing device, according to an example embodiment of the present disclosure.

FIG. 6 illustrates how the anonymized data of interest is returned to the personal software application 100 in the personal computing device 110 of the anonymous data subject, once all the steps 500 to 580 have been successfully executed.

In step 600, it is the personal software application 100 in the personal computing device 110 which opens a communications session with the data exchange software application 135 of the trusted data controller computer server 130, over the communications network. This is possible because the personal software application 100 has the electronic address of the trusted data controller computer server 130 and is configured to contact it periodically.

In step 610, the personal software application 100 transmits a data exchange request to the data exchange software application 135 of the trusted data controller computer server 130, comprising the data subject's anonymous identifier preferably encrypted in the form of a digital signature. The data exchange software application 135 logs the metadata of the communications session (anonymous identifier and timestamp) in the log file 490 in the trusted data controller computer server 130.

In step 620, the data exchange software application 135 in the trusted data controller computer server 130 reads the anonymous identifier and its digital signature, if present, and must determine whether it is a valid request.

In step 630, the data exchange software application 135 searches the user registration database 470 located in the trusted data controller computer server 130 and compares the received anonymous identifier with the anonymous identifiers stored in the user registration database 470. If it is a digital signature, the cryptographic software module 401 verifies it using the received anonymous identifier as the decryption key of the digital signature.

In step 635, if there is not a match between the received anonymous identifier and any stored anonymous identifiers, then the received anonymous identifier is invalid. In the case of the decrypted digital signature not being identical to the received anonymous identifier, the request is also invalid. The data exchange software application 135 of the trusted data controller computer server 130 stops responding to the personal software application 100 in the communications session.

In step 640, if there is a match between the received anonymous identifier and any stored anonymous identifiers, or if the decrypted digital signature matches the received anonymous identifier, then the received anonymous identifier and the data exchange request are valid.

The data exchange software application 135 searches the application database 480 in the trusted data controller computer server 130 for anonymized data of interest identified by the validated anonymous identifier and obtains the most recent data of interest of the anonymous data subject by referring to the log file 490 that contains the date of the previous communications session between the data subject's personal software application 100 and the data exchange software application 135 in the trusted data controller computer server 130.

In step 650, the data exchange software application 135 in the trusted data controller computer server 130 transmits the most recent information of interest to the personal software application 100 in the personal computing device 110.

In step 660, the personal software application 100 receives the information of interest, organizes it and stores it in the database of information of interest 280 in the data subject's personal computing device 110.

In step 670, the data subject opens the personal software application 100 in its personal computing device 110 and consults and uses the information of interest 280.

It will be appreciated that in the case of information of interest comprising very large files, which is the case when transmitting images and photographs, transmission times may be long. In order to shorten the transfer time of one such large file, the data exchange software application 135 in the trusted data controller computer server 130 may transmit a link address under which the file is stored in the application database 480 of the trusted data controller computer server 130, to the personal software application 100, instead of the large file. In this embodiment, whenever the data subject wishes to consult and use these large files, selecting the link address in the personal software application 100 automatically triggers the data exchange request and the anonymous identifier verification process described in steps 610 to 640 and the large file is then actually transmitted by the data exchange software application 135 in the trusted data controller computer server 130 to the database of information of interest 280, to be displayed in the personal software application 100. In a similar embodiment, this bandwidth sparing process may be used for all regular transmissions of data of interest between the data subject's personal software application 100 and the data exchange software application 135 in the trusted data controller computer server 130.

Thus, the trusted data controller computer server 130 is able to collect anonymized data of interest from multiple data providers computer servers 120 and to transmit it to the personal software application 100 of its rightful, yet anonymous owner. This represents an advance in the protection of privacy rights of data subjects when personal data is exchanged.

As the application database 480 acquires more information of interest from a large number of data subjects running the personal software application 100 in their personal computing devices 110, and from all participating data provider computer servers 120, the trusted data controller computer server 130 is able to build a very large application database 480 and to perform large-scale computer processing of anonymized data, using techniques such as statistical processing, Big Data processing, machine learning and artificial intelligence to obtain new information from the stored data, using the data science software application 495. This will be particularly relevant in the case of health data and health care, establishing new relationships between drugs, treatments and therapies and quantifying their impact on each individual or class of individuals, leading to precision medicine using real-world data and better individual and public health. This will also be useful in the business of identifying consumer preferences, purchasing patterns or social interactions, from the large-scale processing of personal data, but without knowing the name of the data subject. Such useful processing will only be possible if vast amounts of personal data are gathered in computers. The present invention permits such large accumulation of personal data in a way that prevents computers processing it from associating the data with an identified person and therefore solves the problem of protecting the privacy rights of people whose personal data is processed by those computers.

Although particular embodiments of the system and method of the present invention have been illustrated in the accompanying drawings and described in the foregoing detailed description, it will be understood that the invention is not limited to the embodiments disclosed, namely in the use of more or less cryptographic means and multiple combinations thereof, but is capable of numerous rearrangements, modifications, and substitutions without departing from the spirit of the invention.

The invention claimed is:

1. A method to execute a login process for a data subject to a trusted data controller computer server using a personal software application installed on a personal computing device of the data subject, in which the data subject identifies itself exclusively via an encrypted anonymous identifier, and to return information of interest by the trusted data controller computer server to the data subject to its personal software application, comprising the steps:

a. the data subject downloads and installs the personal software application and a cryptographic software module in its personal computing device and enters at least the person's name and personal identifiers and optional consent, b. the cryptographic software module in the personal computing device generates an anonymous identifier and an encrypted version of the anonymous identifier, c. the personal software application in the personal computing device contacts a data exchange software application in one or more data provider computer servers storing data related to the data subject, the data provider computer servers and the data exchange software application being configured to securely exchange data, and transmits the name of the data subject, personal identifiers, the encrypted anonymous identifier and the optional consent to the data exchange software application which receives the name of the data subject, personal identifiers, the encrypted anonymous identifier and the optional consent, d. the data exchange software application of the one or more data provider computer servers receives and records at least the data subject's name, personal identifiers and encrypted anonymous identifier and optional consent and searches the data provider computer server application databases for data related to the data subject, by means of the data subject's name and personal identifiers, e. on finding the data of interest, the data exchange software application of the one or more data provider computer servers creates a message to which it adds the data of interest, the data subject's encrypted anonymous identifier and removes the data subject's name and all personal identifiers to anonymize the data of interest, f. the data exchange software application of the one or more data provider computer servers transmits the message containing the anonymized data of interest solely identified by the data subject's encrypted anonymous identifier to the trusted data controller computer server, g. the data exchange software application in the trusted data controller computer server, being configured to securely exchange data with the data exchange application of one or more data provider computer servers, receives the message and reads it, decrypts the encrypted anonymous identifier to obtain the original anonymous identifier, verifies whether the anonymous identifier is already recorded in the user registration database located in the trusted data controller computer server and
 i. on not finding the anonymous identifier, records the anonymous identifier as a new user in the user registration database, records the anonymous identifier and the message metadata in a log file and stores the at least data subject's anonymized data of interest and the anonymous identifier in an application database, the anonymized data of interest being identified solely by the data subject's anonymous identifier, or
 ii. on finding the anonymous identifier, records the anonymous identifier and the message metadata in a log file and stores the at least data subject's anonymized data of interest in an application database, identified solely by the data subject's anonymous identifier, h. the transmission of anonymized data of interest occurs periodically between the data exchange software applications of the one or more data provider computer servers and the data exchange software application of the trusted data controller computer server so that new anonymized data of interest related to the same data subject is continuously added to the application database in the trusted data controller computer server, i. the personal software application in the personal computing device of the data subject and the data exchange software application of the trusted data controller computer server, being configured to securely communicate with each other, establish communication and the data exchange software application of the trusted data controller computer server transmits the anonymized data of interest to the personal software application in the personal computing device thereby returning the anonymized data to the anonymous data subject, wherein the transmission of the anonymized data of interest between the trusted data controller computer server and the personal computing device of the anonymous data subject occurs by means of a communications session always initiated by the personal software application in the personal computing device of the data subject, to connect to the known electronic address of the trusted data controller computer server and the data exchange software application in the trusted data controller computer server must wait for the communications session to be started by the personal software application, the trusted data controller computer server being prevented from initiating such a communication session in the absence of any information about the data subject's name, personal identifiers or personal computing device electronic address.

2. The method of claim 1, wherein the communications session between the personal software application in the personal computing device of the data subject and the data exchange software application in the trusted data controller computer server is initiated by the personal software application transmitting a data exchange request identified exclusively by the anonymous identifier of the data subject or by digital signature, the data exchange software application receiving the data exchange request and confirming that a valid request has been received and that the stored anonymous identifier and the received anonymous identifier correspond to the same anonymous data subject.

3. The method of claim 1, where the anonymous identifier is generated as an asymmetric public key by a cryptographic software module in the personal computing device, being derived from a randomly generated private cryptographic key, and is encrypted using the cryptographic software module by means of the known public cryptographic key of the trusted data controller computer server, and the personal software application transmits the at least data subject's name, personal identifiers and the encrypted anonymous identifier to each data provider computer server, the data exchange software application in the one or more data provider computer servers receiving it and including the encrypted anonymous identifier in the message containing the anonymized data of interest, transmitting it to the data exchange software application of the trusted data controller computer server, a cryptographic software module in the trusted data controller computer server receiving and decrypting the encrypted anonymous identifier by means of the private cryptographic key of the trusted data controller computer server.

4. The method of claim 1, where the anonymous identifier is an identification key, an authentication key and a cryptographic key.

5. The method of claim 1, where the cryptographic software modules encrypting communications between the data subject personal computing device, the one or more data provider computer servers and the trusted data controller computer servers use asymmetric cryptographic keys, employing the Elliptical Curve Digital Signature Algorithm.

6. The method of claim 1, wherein the personal software application in the personal computing device of the data subject opens a communications session with the data exchange software application in the trusted data controller computer server at default time intervals configured in the personal software application or at preferred time intervals configured by the data subject or at any time at the data subject's command.

7. The method of claim 1, wherein the transmission of messages containing anonymized data of interest from the one or more data provider computer servers to the trusted data controller computer server, or the registration of a new anonymous data subject in the trusted data controller user registration database, or the communication of anonymized data of interest from the trusted data controller to the personal computing device of the data subject, occurs without the data subject employing a conventional user-defined username and system password stored in any of the computer servers and the verification of the data subject's identity by the data exchange software application in the trusted data controller computer server is achieved solely by means the data subject's anonymous identifier.

8. The method of claim 1, wherein the data subject's personal data is collected from the application databases in the one or more data provider computer servers, is anonymized and is transmitted to a trusted data controller computer server, where it is collected and organized under the identity of the data subject's anonymous identifier and is returned to the personal software application in the personal computing device of the data subject by the data exchange software application in the trusted data controller computer server.

9. A computer system for executing a login process for a data subject to a trusted data controller computer server, the computer system comprising:
   a. a personal computing device of the data subject, the personal computing device having a cryptographic software module configured to generate a user's anonymous identifier and an encrypted version thereof, the personal computing device further having a personal software application installed thereon, and the personal software application being configured to contact a data exchange software application in one or more data provider computer servers storing data related to the data subject, the data provider computer servers and the data exchange software application being configured to securely exchange data, and being configured to transmit the name of the data subject, personal identifiers, the encrypted anonymous identifier and an optional consent to the data exchange software application which is configured to receive the name of the data subject, personal identifiers, the encrypted anonymous identifier and the optional consent;
   b. a plurality of the data provider computer servers having the data exchange software application, the data exchange software application configured to:
      receive and record at least the data subject's name, personal identifiers and encrypted anonymous identifier and optional consent and to search the data provider computer server application databases for data related to the data subject, by means of the data subject's name and personal identifiers,
      create, on finding the data of interest, a message and to add the data of interest, the data subject's encrypted anonymous identifier to the message and to remove the data subject's name and all personal identifiers from the message to anonymize the data of interest, and
      transmit the message containing the anonymized data of interest solely identified by the data subject's encrypted anonymous identifier to the trusted data controller computer server;
   c. the trusted data controller computer server having a data exchange software application configured to
      securely exchange data with the data exchange application of the one or more data provider computer servers,
      receive the message and to read the message,
      decrypt the encrypted anonymous identifier to obtain the original anonymous identifier,
      verify whether the anonymous identifier is already recorded in the user registration database located in the trusted data controller computer server,
      record, on not finding the anonymous identifier, the anonymous identifier as a new user in the user registration database and store the at least data subject's anonymized data of interest and the anonymous identifier in an application database, or record, on finding the anonymous identifier, the anonymous identifier and the message metadata in a log file and store the at least data subject's anonymized data of interest in an application database;
   wherein the transmission of the anonymized data of interest between the trusted data controller computer server and the personal computing device of the anonymous data subject occurs by means of a communications session always initiated by the personal software application in the personal computing device of the data subject, to connect to the known electronic address of the trusted data controller computer server and the data exchange software application in the trusted data controller computer server is configured to wait for the communications session to be started by the personal software application, the trusted data controller computer server being configured to be prevented from initiating such a communication session in the absence of any information about the data subject's name, personal identifiers or personal computing device electronic address.

10. A non-transitory computer medium storing source code, that, when executed by a processor, performs a method to execute a login process for a data subject to a trusted data controller computer server using a personal software application installed on a personal computing device of the data subject, in which the data subject identifies itself exclusively via an encrypted anonymous identifier, and to return information of interest by the trusted data controller computer server to the data subject to its personal software application, comprising the steps:
   a. the data subject downloads and installs the personal software application and a cryptographic software module in its personal computing device and enters at least the person's name and personal identifiers and optional consent,
   b. the cryptographic software module in the personal computing device generates an anonymous identifier and an encrypted version of the anonymous identifier,
   c. the personal software application in the personal computing device contacts a data exchange software application in one or more data provider computer servers storing data related to the data subject, the data provider computer servers and the data exchange software application being configured to securely exchange data, and transmits the name of the data subject, personal identifiers, the encrypted anonymous identifier and the optional consent to the data exchange software application which receives the name of the data subject, personal identifiers, the encrypted anonymous identifier and the optional consent,
   d. the data exchange software application of the one or more data provider computer servers receives and records at least the data subject's name, personal identifiers and encrypted anonymous identifier and optional consent and searches the data provider computer server application databases for data related to the data subject, by means of the data subject's name and personal identifiers,
   e. on finding the data of interest, the data exchange software application of the one or more data provider computer servers creates a message to which it adds the data of interest, the data subject's encrypted anonymous identifier and removes the data subject's name and all personal identifiers to anonymize the data of interest, f. the data exchange software application of the one or more data provider computer servers transmits the message containing the anonymized data of interest solely identified by the data subject's encrypted anonymous identifier to the trusted data controller computer server, g. the data exchange software application in the trusted data controller computer server, being configured to securely exchange data with the data exchange application of one or more data provider computer servers, receives the message and reads it, decrypts the encrypted anonymous identifier to obtain the original anonymous identifier, verifies whether the anonymous identifier is already recorded in a user registration database located in the trusted data controller computer server and i. on not finding it, records the anonymous identifier as a new user in the user registration database, records the anonymous identifier and the message metadata in a log file and stores the at least data subject's anonymized data of interest and the anonymous identifier in an application database, the anonymized data of interest being identified solely by the data subject's anonymous identifier, or ii. on finding it, records the anonymous identifier and the message metadata in a log file and stores the at least data subject's anonymized data of interest in an application database, identified solely by the data subject's anonymous identifier, h. the transmission of anonymized data of interest occurs periodically between the data exchange applications of the one or more data provider computer servers and the data exchange software application of the trusted data controller computer server so that new anonymized data of interest related to the same data subject is continuously added to the application database in the trusted data controller computer server, i. the personal software application in the personal computing device of the data subject and the data exchange software application of the trusted data controller computer server, being configured to securely communicate with each other, establish communication and the data exchange software application of the trusted data controller computer server transmits the anonymized data of interest to the personal software application in the personal computing device thereby returning the anonymized data to the anonymous data subject, wherein the transmission of the anonymized data of interest between the trusted data controller computer server and the personal computing device of the anonymous data subject occurs by means of a communications session always initiated by the personal software application in the personal computing device of the data subject, to connect to the known electronic address of the trusted data controller computer server and the data exchange software application in the trusted data controller computer server must wait for the communications session to be started by the personal software application, the trusted data controller computer server being prevented from initiating such a communication session in the absence of any information about the data subject's name, personal identifiers or personal computing device electronic address.

* * * * *